June 5, 1923.
G. DOOSE ET AL
1,458,116
TRAFFIC SIGNAL FOR MOTOR VEHICLES
Filed Oct. 6, 1921     2 Sheets-Sheet 1
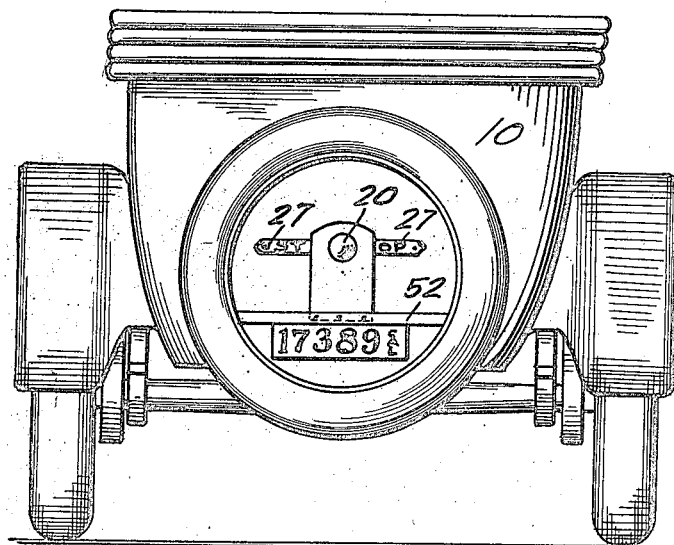
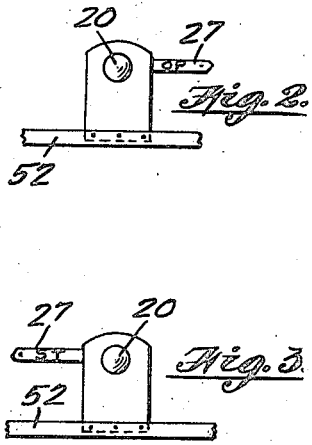
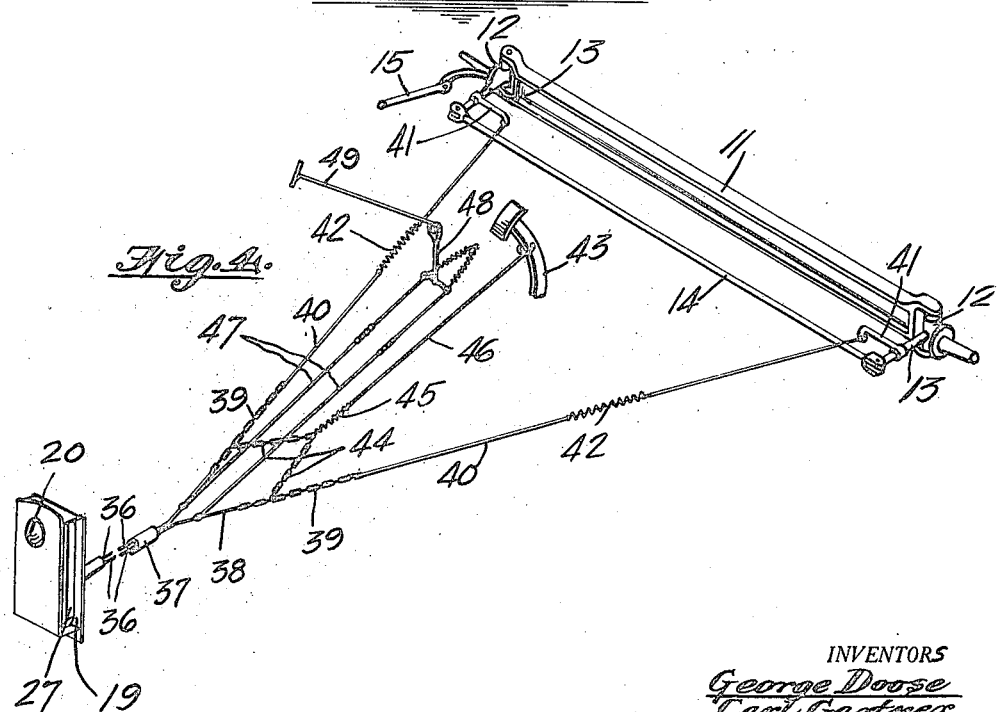
INVENTORS
George Doose
Carl Gartner
BY
Hazard & Miller
ATTORNEYS June 5, 1923.
G. DOOSE ET AL
1,458,116
TRAFFIC SIGNAL FOR MOTOR VEHICLES
Filed Oct. 6, 1921   2 Sheets-Sheet 2
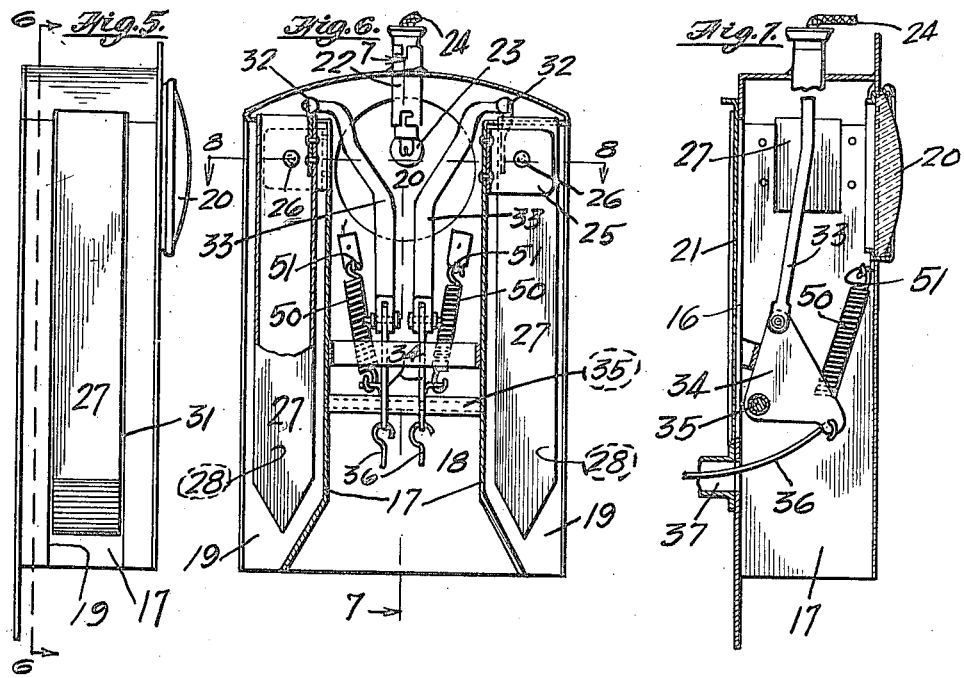
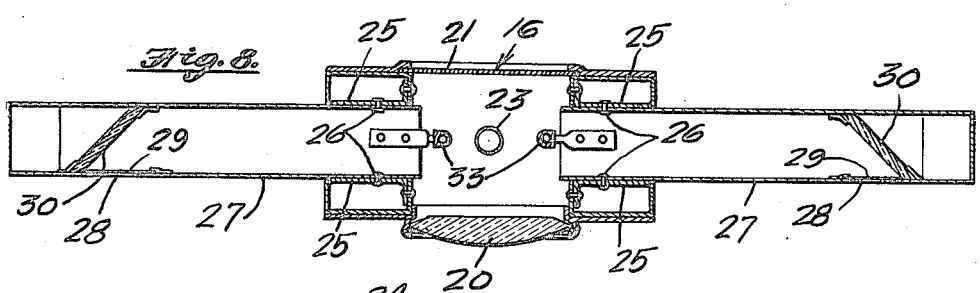
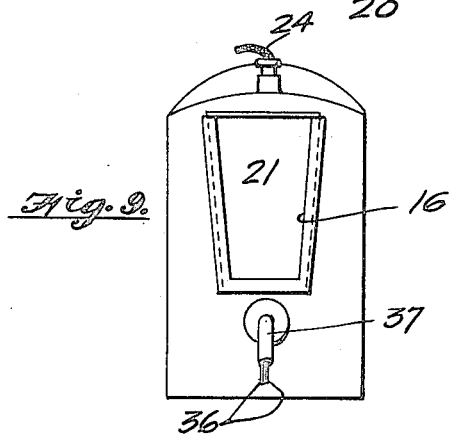
INVENTORS
George Doose
Carl Gaertner
BY
Hazard & Miller
ATTORNEYS

Patented June 5, 1923.

1,458,116

UNITED STATES PATENT OFFICE.

GEORGE DOOSE AND CARL GARTNER, OF PASADENA, CALIFORNIA.

TRAFFIC SIGNAL FOR MOTOR VEHICLES.

Application filed October 6, 1921. Serial No. 505,714.

*To all whom it may concern:*

Be it known that we, GEORGE DOOSE and CARL GARTNER, citizens of the United States, residing at Pasadena, in the county of Los Angeles and State of California, have invented new and useful Improvements in Traffic Signals for Motor Vehicles, of which the following is a specification.

Our invention relates to a traffic signal and direction indicator for motor vehicles, the principal objects of our invention being to generally improve upon and simplify the construction of the existing types of vehicle direction indicators, to provide a relatively simple, practical and efficient device that may be readily combined with certain of the operating parts of the vehicle and which will act positively as said parts are manipulated or actuated during the operation of the vehicle, to provide a traffic signal for vehicles that may be easily and cheaply produced, and further to provide a traffic signal that may be illuminated so as to be readily visible at night.

With the foregoing and other objects in view, our invention consists in certain novel features of construction and arrangement of parts that will be hereinafter more fully described and claimed and illustrated in the accompanying drawings, in which:

Fig. 1, is a rear elevational view of a motor vehicle, and showing the same equipped with a direction indicator of our improved construction.

Fig. 2, is a rear elevational view of the housing of the signal, and showing one of the movable members therein occupying a horizontal position to indicate a right hand turn.

Fig. 3, is a rear elevational view of the housing of the signal with one of the movable arms thereof raised to horizontal position to indicate a left hand turn.

Fig. 4, is a perspective view of the front axle of a vehicle and associated parts, and showing the connections between said parts and the housing of our improved traffic signal.

Fig. 5, is a side elevational view of the housing of the signal.

Fig. 6, is a vertical section taken on the line 6—6 of Fig. 5.

Fig. 7 is a vertical section taken on the line 7—7 of Fig. 6.

Fig. 8, is a horizontal section taken approximately on the line 8—8 of Fig. 6, and showing the direction indicating arms in raised positions.

Fig. 9, is an elevational view looking against the rear side of the housing of the signal.

Referring by numerals to the accompanying drawings which illustrate a practical embodiment of our invention, 10 designates the body of a motor vehicle, 11 the front axle thereof, 12 the steering knuckles that are pivotally mounted in the usual manner upon the ends of axle 11, 13 the crank arms that project rearwardly from the steering knuckles, 14 the transverse rod that connects said arms 13, and 15 a part of the manually operated steering mechanism that is effective in imparting movement to the steering knuckles.

Our improved signal includes a substantially rectangular housing 16, preferably of sheet metal, and arranged within said housing is a pair of vertically disposed partitions 17, that divide the space within said housing into a centrally arranged chamber 18 and side chambers 19.

Formed in the upper portion of the front wall of housing 16 is an opening that is closed by a glass disk or lens 20, and formed in the upper portion of the rear or inner wall of the housing, is an opening that is normally closed by a movable plate 21.

Depending from the top plate of the housing 16 is a tubular socket 22 for a small electric lamp 23, and leading to the terminals within the socket 22 from a source of electric current supply, are conductors 24.

Projecting downwardly from the upper portion of the partitions 17, are pairs of ears 25, and pivotally connected to said ears by horizontally disposed pins or rivets 26, are the upper ends of hollow arms 27, preferably formed of sheet metal. The outer ends of these arms are preferably pointed, and formed through the front wall of said arms adjacent to their outer pointed ends, are openings 28 in which are located sections 29 of glass or like transparent material.

Arranged within the outer portions of the arms 27, and directly behind the openings 28, are mirrors 30 or like reflecting members that are arranged at angles of 90 deg. with respect to the front wall of said arms, and with respect to the longitudinal axes of said arms.

The pivot points for the arms 27 are arranged in approximately the same horizontal plane with the lamp 23, and thus when said arms are swung upwardly into horizontal positions the rays of light from lamp 23 will pass outwardly through the hollow arms, and be directed forwardly by the mirrors 30, through the glazed openings 28, and thus the signal may be readily observed at night.

The side walls of the housing 16 are cut away or provided with vertically disposed slots 31 which enables the arms 27 to swing outwardly and upwardly when actuated to give a signal.

Appearing on the outer face of the front wall of the left hand one of the arms 27, are the letters ST and appearing on the corresponding face of the right hand one of said arms 27, are the letters OP, and thus the four letters form the word Stop, which may be easily read when both arms are swung upwardly into a horizontal plane as illustrated in Fig. 1.

Connected by a ball and socket joint 32 to the upper end of each arm 27 is the upper end of inwardly and downwardly extending arm 33, the lower end thereof being pivotally connected to the upper end of a substantially triangular plate 34, and each plate being journalled at its lower rear corner to a pin or shaft 35, the ends of which are seated in the partition walls 17.

Connected in any suitable manner to the lower front corner of each plate 34 is a rear end of a flexible rod 36, the latter extending through an opening 37 formed in the lower portion of the rear wall of the housing, and the outer ends of said flexible members are connected to short pull rods or links 38, and which latter are connected to short flexible members 39, preferably chains.

The forward ends of the chains 39 are connected by cables 40 or the like, to relatively short arms 41 that project inwardly from the arms 13 of the steering knuckles 12, and located at an intermediate point in each member 40 is a short retractile spring 42.

The parts just described provide means for independently moving the arms 27 to signalling positions when the vehicle is turned laterally in either direction. For instance, when the vehicle is turned toward the right hand, the arm 41 on the right hand steering knuckle will be swung inwardly and forwardly, thereby pulling forwardly on the parts connected to said arms so as to swing the right hand arm 27 outwardly and upwardly into signalling position, and as the left hand arm 41 is simultaneously swung rearwardly, the corresponding chain 39 will slacken and there will be no actuation of the corresponding or left hand signalling arm 27.

Obviously, when the vehicle is turned toward the left hand, the operations just described will be reversed, and the left hand one of the arms 27 will be elevated to signalling position, and the right hand arm will retain its normal vertical position within the housing.

In order that both arms 27 may be swung upward into signalling positions when the vehicle is stopped, connections from the pull rods 38 may be made to the clutch pedal 43, or to the foot brake pedal, and which connections include short chain sections 44, the rear ends of which are connected to the forward ends of pull rods 38, and the forward ends of said chain sections 44 being connected to each other and to retractile spring 45, the opposite end of which latter is connected by a rod or cable 46 to clutch pedal or foot brake lever.

Thus when the pedal 43 is actuated to throw out or disconnect the clutch, or when the brake lever is actuated, the parts 46, 45 and 44 will act to simultaneously pull the parts 38 and 36 so as to swing both signalling arms 27 outwardly and upwardly into the positions illustrated in Fig. 1, thereby indicating to the driver of a following vehicle that the vehicle equipped with the signalling device is about to stop.

To provide means for manually operating the signalling arms 27, rods or cables 47 are connected to pull rods 38, and the forward ends of said rods or cables are connected to the lower portion of a short vertically disposed lever 48, and which latter is connected to an operating handle 49 that extends upwardly into the body of the vehicle adjacent to the driver's seat.

By pulling upwardly and rearwardly on a handle 49, the members 47 are simultaneously turned forward, thereby imparting corresponding movement to the parts 38 and 36, and consequently elevating the signalling arms 27.

To normally retain the arms 27 in position within the housing, and to prevent the associated parts from vibrating and rattling, retractile springs 50 are connected to the lower forward ends of the triangular plates 34, the upper ends of which springs are connected to hooks 51 that are located on the front wall of housing 16 below the glass disk or lens 20 therein.

It will be understood that whenever flexible members 36 are pulled outwardly or through the opening 37, in the rear wall of the housing, the triangular plates 34 will be swung upon the pin or shaft 35 thereby drawing arms 33 downwardly, with the result that the signalling arms 27 will be swung upward into a substantially horizontal plane.

The disk or lens 20 is preferably colored red and thus when the lamp 23 is burning, said colored disk serves as a tail light for the vehicle.

The housing 16 is preferably located on a transverse bar or rail 52, on the rear lower portion of the vehicle body and by arranging the license plate on said rail immediately below the housing of the device, the face of said license plate will be illuminated at night by the rays of light from lamp 23 that pass downwardly through the central chamber within the housing.

Thus it will be seen that we have provided a relatively simple, practical and efficient traffic signal for vehicles, and which signal includes a pair of independently movable signalling arms that are moved into signalling positions to indicate to the driver of a following vehicle, the movements of the vehicle to which the signalling device is applied, and said signalling device being provided with means for illuminating transparent portions of the signalling arms so that the device may serve the purpose for which it is intended at night as well as in the day time.

It will be understood that minor changes in the size, form and construction of the various parts of my improved traffic signal, may be made and substituted for those herein shown and described without departing from the spirit of my invention, the scope of which is set forth in the appended claims.

We claim as our invention:

1. The combination with a motor vehicle, and the steering mechanism associated with the front wheels thereof, of a signal device located on the rear portion of the body of the vehicle, a pair of signalling arms forming a part of said device, connections from said signalling arms to parts of the steering mechanism associated with the front axle, whereby said signalling arms are actuated to correspond with the movement of the actuated parts of the steering mechanism, and means connected to a part of the vehicle operating means for simultaneously actuating both of the signalling arms.

2. In a vehicle direction signal, a housing provided with a centrally arranged chamber and a pair of side chambers, there being a glazed opening in one of the walls surrounding the central chamber, a source of light within said housing behind said glazed opening, hollow signalling arms pivotally mounted within the housing and occupying the side chambers therein, said signalling arms being provided with glazed openings in their front walls, reflecting surfaces arranged within said arms behind glazed openings therein, and means adapted to be connected to parts of the steering mechanism of the vehicle with which the signal is associated for independently operating said arms.

3. In a vehicle direction signal, a housing provided with a centrally arranged chamber and a pair of side chambers, there being a glazed opening in one of the walls surrounding the central chamber, a source of light within said housing behind said glazed opening, hollow signalling arms pivotally mounted within the housing and occupying the side chambers therein, said signalling arms being provided with glazed openings in their front walls, reflecting surfaces arranged within said arms behind glazed openings therein, means adapted to be connected to parts of the steering mechanism of the vehicle with which the signal is associated for independently operating said arms, and means adapted to be connected to a part of the vehicle operating mechanism for simultaneously actuating said signalling arms.

4. In a traffic signal for motor vehicles, a housing, a pair of signalling arms pivotally mounted within said housing and adapted to be swung into signalling positions, means adapted to be connected to parts of the steering mechanism of the vehicle with which the device is associated for swinging said arms into signalling positions, and means associated with the arm actuating parts for holding the same and said arms against undue vibration.

5. In a traffic signal for motor vehicles, a housing, provided with a glazed opening, a pair of hollow signalling arms arranged for operation within said housing, which arms are provided with glazed openings, reflecting surfaces within said arms adjacent to said openings, and a source of light within the housing for illuminating the interior thereof, and the interiors of said hollow arms.

6. A direction indicating signal for vehicles comprising a casing, right and left signaling arms mounted in the casing to occupy a projected position in which they are exposed to view and a retracted position in which they are concealed within the housing, and means adapted to be associated with the steering mechanism of the vehicle for projecting one arm or the other according as the steering mechanism is turned in one direction or the other.

7. A direction indicating signal for vehicles comprising a casing, right and left signaling arms mounted in the casing to occupy a projected position in which they are exposed to view and a retracted position in which they are concealed within the housing, and means adapted to be associated with the steering mechanism of the vehicle for projecting one arm or the other according as the steering mechanism is turned in one direction or the other, said means comprising arms, cables connected to the arms, and pull rods connected to the cables and adapted for connection with the steering arms of the vehicle.

8. A direction indicating signal for vehicles comprising a casing, right and left signaling arms mounted in the casing to occupy a projected position in which they are exposed to view and a retracted position in which they are concealed within the housing, means adapted to be associated with the steering mechanism of the vehicle for projecting one arm or the other according as the steering mechanism is turned in one direction or the other, means associated with the last named means for manually operating the signaling arms independently of the first means, and pedal actuated means for operating the signaling arms independently of the other means.

9. A direction indicating signal for vehicles comprising a casing, right and left signaling arms mounted in the casing to occupy a projected position in which they are exposed to view and a retracted position in which they are concealed within the housing, and means adapted to be associated with the steering mechanism of the vehicle for projecting one arm or the other according as the steering mechanism is turned in one direction or the other, said means comprising flexible members connected to the signal arms, rigid members adapted for connection to the steering mechanism, and yieldable members connecting the flexible and rigid members.

10. A direction indicating signal for vehicles comprising a casing, right and left signaling arms mounted in the casing to occupy a projected position in which they are exposed to view and a retracted position in which they are concealed within the housing, means adapted to be associated with the steering mechanism of the vehicle for projecting one arm or the other according as the steering mechanism is turned in one direction or the other, and means associated with the last means for manually operating the signaling arms independently of the first means, both of said means including flexible members connected to the signal arms, rigid members adapted to be connected to the steering mechanism, and yieldable members connecting the flexible and rigid members.

11. A direction indicating signal comprising a housing, a pair of signaling arms arranged for operation within the housing to occupy extended and retracted positions each of which arms is hollow and provided in its front wall with a closed opening, and means within the housing and common to both of the arms for interiorly illuminating the latter when in projected position.

In testimony whereof we have signed our names to this specification.

GEORGE DOOSE.
CARL GARTNER.